(12) United States Patent
Troitski

(10) Patent No.: US 6,399,914 B1
(45) Date of Patent: Jun. 4, 2002

(54) METHOD AND LASER SYSTEM FOR PRODUCTION OF HIGH QUALITY LASER-INDUCED DAMAGE IMAGES BY USING MATERIAL PROCESSING MADE BEFORE AND DURING IMAGE CREATION

(75) Inventor: Igor Troitski, 853 Arrowhead Trail, Henderson, NV (US) 89015

(73) Assignee: Igor Troitski, Henderson, NV (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 84 days.

(21) Appl. No.: 09/613,296

(22) Filed: Jul. 10, 2000

(51) Int. Cl.⁷ .................................................. B23K 26/00
(52) U.S. Cl. ................................................... 219/121.69
(58) Field of Search ....................... 219/121.68, 121.69, 219/121.83, 121.85; 264/400, 1.37

(56) References Cited

U.S. PATENT DOCUMENTS

| | | |
|---|---|---|
| 4,092,518 A | 5/1978 | Merard |
| 4,843,207 A | 6/1989 | Urbanek |
| 5,206,496 A | 4/1993 | Clement |
| 5,575,936 A | 11/1996 | Goldfarb |
| 5,637,244 A | 6/1997 | Erokhin |
| 5,886,318 A | 3/1999 | Vasiliev et al. |
| 5,968,441 A | * 10/1999 | Seki ............................ 264/400 |

FOREIGN PATENT DOCUMENTS

| | | | |
|---|---|---|---|
| EP | 0743 128 A1 | 5/1995 | |
| RU | 321422 | 11/1970 | |
| RU | 2059575 C1 | 4/1993 | |
| RU | 1818307 | * 5/1993 | ............ 219/121.68 |
| RU | 20082288 C1 | 2/1994 | |
| SU | SU1838163 | 7/1990 | |
| SU | 1838163 | 3/1992 | |
| WO | WO 96/30219 | 3/1995 | |

OTHER PUBLICATIONS

"Laser-induced damage creates interior images", OE Reports, No. 191, Nov. 1999.*

* cited by examiner

Primary Examiner—Samuel M. Heinrich

(57) ABSTRACT

Embodiments of methods and an apparatus for creating high quality laser-induced damage images are disclosed. One or more embodiments of the invention comprise a method for producing laser-induced images inside the special transparent material containing special kinds of impurities, which decrease the damage threshold of the material. Laser radiation is focused inside the transparent material in such a way that focal area contains at least one said impurity. Other embodiments of the invention comprise a method and a system for producing laser-induced images by using two lasers. The first laser generates radiation, which heats the predetermined material area about a point, where breakdown should be produced, to the vitrify temperature. The second laser generates radiation, which creates breakdown in a point of the heated area after the area is heated to the vitrify temperature. The focal spot of the first radiation contains the focal spot of the second radiation and they migrate during production of images so that their positional relationship is not modified.

7 Claims, 3 Drawing Sheets

METHOD AND LASER SYSTEM FOR PRODUCTION OF HIGH QUALITY LASER-INDUCED DAMAGE IMAGES BY USING MATERIAL PROCESSING MADE BEFORE AND DURING IMAGE CREATION

FIELD OF THE INVENTION

The present invention relates to a method and apparatus for producing laser-induced damage points in transparent objects for use in generating high quality images.

BACKGROUND OF THE INVENTION

A number of techniques for creating a variety of patterns on the surface and inside of transparent substrates using pulsed laser radiation are well known.

One publication disclosing such techniques is the Russian invention # 321422 to Agadjanov et. al., published on Nov. 16, 1970 (#140454529-33). The invention concerns a method of manufacturing decorative products inside a transparent material by changing the material structure by laser radiation. As disclosed, by moving a material relative to a focused laser beam, it is possible to create a drawing inside the material.

U.S. Pat. No. 4,092,518 to Merard discloses a method for decorating transparent plastic articles. This technique is carried out by directing a pulsed laser beam into the body of an article by successively focusing the laser beam in different regions within the body of the article. The pulse energy and duration is selected based upon the desired extent of the resulting decorative pattern. The effect of the laser is a number of three dimensional "macro-destruction" (fissures in the material of the article) appearing as fanned-out cracks. The pattern of the cracks produced in the article is controlled by changing the depth of the laser beam focus along the length of the article. Preferably, the article is in the form of a cylinder, and the cracks are shaped predominantly as saucer-like formations of different size arranged randomly around the focal point of the optical system guiding a laser beam. The device used to carry out this technique is preferably a multi-mode solid-state, free-running pulse laser used in conjunction with a convergent lens having a focal length from 100 to 200 mm. multi-mode solid-state, free-running pulse laser used in conjunction with a convergent lens having a focal length from 100 to 200 mm.

U.S. Pat. No. 4,843,207 to Urbanek et al., discloses a method of creating controlled decorations on the surface of a hollow symmetrical transparent article. This technique is preferably carried out on glass. The glass is preconditioned with a coating on the outer surface of the glass being approximately 1.2 mm thick and made of a material having at least 75% absorption of laser radiation. The technique is also carried out using a laser having a wave of length of 0.5 to 2 microns acting upon the external coating through the wall of the cylindrical glass article. The laser beam moves so that it is focused on the surface of the cylinder, and moves about the axis of symmetry of the cylinder to irradiate the aforementioned surface coating. As a result, the irradiated portions of the surface coating go through a phase change and a pattern is formed.

U.S. Pat. No. 5,206,496 to Clement et al. discloses a method and apparatus for providing in a transparent material, such as glass or plastic, a mark which is visible to the naked eye or which may be "seen" by optical instruments operating at an appropriate wavelength. The Clement et al. Patent describes a method and apparatus for producing a subsurface marking which is produced in a body such as bottle, by directing into the body a high energy density beam and bringing the beam to focus at a location spaced from the surface, so as to cause localized ionization of the material. In the preferred embodiment the apparatus includes a laser as the high energy density beam source. The laser may be a Nd-YAG laser that emits a pulsed beam of laser radiation with a wavelength of 1064 nm. The pulsed beam is incident upon a first mirror that directs the beam through a beam expander and a beam combiner to a second mirror. A second source of laser radiation in the form of a low power He—Ne laser emits a secondary beam of visible laser radiation with a wavelength of 638 m. The secondary beam impinges upon the beam combiner where it is reflected toward the second reflecting surface coincident with the pulsed beam of laser radiation from the Nd-YAG laser. The combined coincident beams are reflected at the reflecting surface via reflecting two other surfaces to a pair of movable mirrors for controlling movement of the beam. The beam then passes through a lens assembly into the body to be marked.

Soviet patent publication 1838163 to P. V. Agrynsky, et. al discloses a process for forming an image in a solid media by processing of the optically transparent solid material by a beam of radiation with changeable energy for creation of the image.

WIPO Patent Document No. 96/30219 to Lebedev et al. discloses a technology for creating two- or three-dimensional images inside a polymer material using penetrating electromagnetic radiation. The technology can be used for marking and for producing decorative articles and souvenirs. Specifically, laser radiation is used as the penetrating radiation, and carbonizing polymers are used as the polymer material. By these means, it is possible to produce both black and half-tone images in the articles.

U.S. Pat. No. 5,575,936 to Goldfarb discloses a process and apparatus where a focused laser beam causes local destruction within a solid article, without effecting the surface thereof. The apparatus for etching an image within a solid article includes a laser focused to a focal point within the article. The position of the article with respect to the focal point is varied. Control means, coupled to the laser, and positioning means are provided for firing the laser so that a local disruption occurs within the article to form the image within the article.

U.S. Pat. No. 5,637,244 to Erokhin discloses a technique which depends on a particular optical system including a diffraction limited Q-switched laser (preferably a solid-state single-mode $TEM_{00}$) aimed into a defocusing lens having a variable focal length to control the light impinging on a subsequent focusing lens that refocuses the laser beam onto the transparent article being etched. The laser power level, operation of the defocusing lens, and the movement of the transparent article being etched are all controlled by a computer. The computer operates to reproduce a pre-programmed three-dimensional image inside the transparent article being etched. In the computer memory, the image is presented as arrays of picture elements on various parallel planes. The optical system is controlled to reproduce the stored arrays of picture elements inside the transparent material. A method for forming a predetermined half-tone image is disclosed. Accordance to the method, microdestructions of a first size are created to form a first portion of the image and microdestruction of a second size different from the first size are created to form a second portion of the image. Different sizes of microdestructions are created by changing the laser beam focusing sharpness and the radiation power thereof before each shot.

U.S. Pat. No. 5,886,318 to A. Vasiliev and B. Goldfarb discloses a method for laser-assisted image formation in transparent specimens which consists in establishing a laser beam having different angular divergence values in two mutually square planes. An angle between the plane with a maximum laser beam angular divergence and the surface of the image portion being formed is changed to suit the required contrast of an image.

EPO Patent Document 0743128 to Balickas et al. disclose a method of marking products made of transparent materials which involves concentration of a laser beam in the material which does not absorb the beam, at a predetermined location, destruction of the material by laser pulses and formation of the marking symbol by displacement of the laser beam. Destruction of the material at that location takes place in two stages. In the first stage, the resistance of the material to laser radiation is altered, while, in the second stage, destruction of the material takes place at that location.

U.S. Pat. application Ser. No. 08/643,918 to Troitski et al. discloses a computer graphic system for producing an image inside optically transparent material. An image reproducible inside optically transparent material by the system is defined by potential etch points, in which the breakdowns required to create the image in the selected optically transparent material are possible. The potential etch points are generated based on the characteristics of the selected optically transparent material. If the number of the potential etch points exceeds a predetermined number, the system carries out an optimization routine that allows the number of the generated etch points to be reduced based on their size. To prevent the distortion of the reproduced image due to the refraction of the optically transparent material, the coordinates of the generated etch points are adjusted to correct their positions along a selected laser beam direction.

Russian patent publication RU 20082288 to S. V. Oshemkov discloses a process for laser forming of images in solid media by the way of focusing of laser radiation in a point inside a sample which differs by following: with the aim to save the surface and the volume of the sample before the definite point and creation of three dimensional images, the sample is illuminated with the power density higher than the threshold of volume breakdown and moving the sample relatively to the laser beam in three orthogonal directions.

Soviet patent publication RU 1818307 to I. M. Chyrikov, et al. discloses the method of art treatment of borosilicate and crystal glass by laser radiation of 1.06–4.5 mkm using pretreatment of the material by thermal annealing; the material being treated is placed in condition with T=223–253° K.

Russian patent publication RU 2059575 to N. N. Davidov, et al. discloses the method of artistic processing of the glass articles, mainly from borosilicate and crystal glass by the way of the fritting of the glass, polishing of its surfaces and drawing the picture as the separately situated points sequence at action of laser pulses focused in the mass of the sample at the distance from its internal surface not less than one hundred diameters of laser beam spot, which is differs by the following: the drawing of the picture is performed in the heated air at the temperature not exceeded the difference between temperatures of vitrifying and heat resistance, and illumination by laser radiation is performed between every not less than ten sequentially drawing points at the article.

For production of high quality laser-induced damage images it is necessary to create laser-induced damages without sharp star structure. Particularly, it is difficult to create such damages inside a crystal glass that is very frail (delicate) material. The present patent application discloses the method and the system for production laser-induced damages with reduced sharp star structure inside transparent materials.

SUMMARY OF THE INVENTION

The present invention has its principal task to provide a method and apparatus for creating laser-induced damages inside a transparent material with reduced sharp star structure.

One or more embodiments of the invention comprise a method for producing etch points without sharp star structure by using preliminary treatment of transparent material during of which special kinds of impurities are introduced inside the transparent material.

One or more embodiments of the invention comprise a method for producing laser-induced damage images inside transparent materials containing impurities by focusing laser radiation at areas of the materials so that every their area contains at least one impurity.

One or more embodiments of the invention comprise a method for producing colored laser-induced damage images inside transparent materials containing color impurities, which are invisible before laser interaction, but after laser breakdown become obvious.

One or more embodiments of the invention comprise a method and a system for producing laser-induced damage images by using two lasers. The first laser generates radiation, which heats the predetermined material area about a point, where breakdown should be produced, to the vitrify temperature. The second laser generates radiation, which creates breakdown in a point of the heated area after the area is heated to the vitrify temperature. The focal spot of the first radiation contains the focal spot of the second radiation and they migrate during production of images so that their positional relationship is not modified.

Further objects, features, and advantages of the present invention over the prior art will become apparent from the detailed description of the drawings, which follow, when considered with the attached figures.

DETAILED DESCRIPTION OF THE INVENTION

Figure 1:
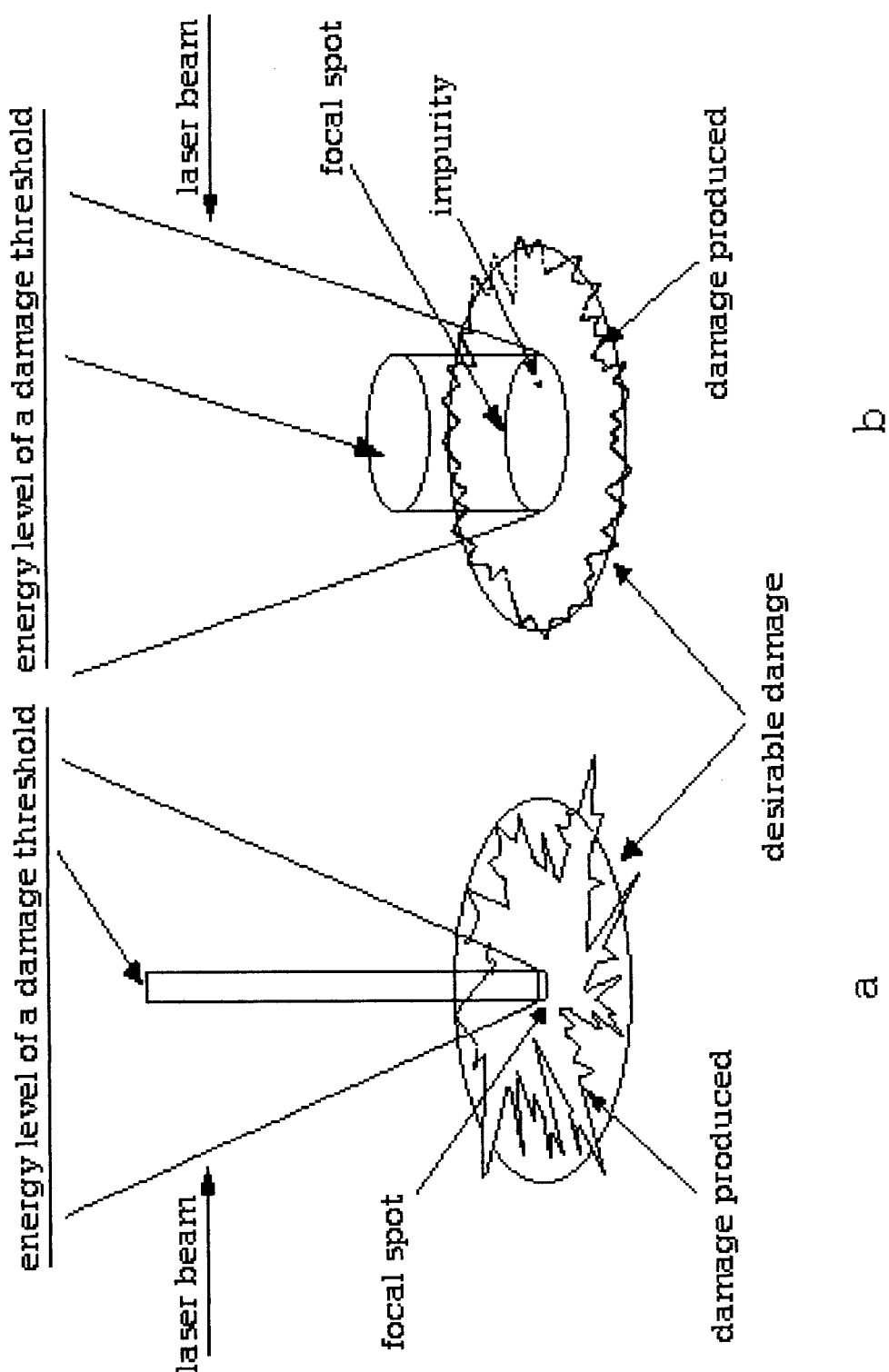
FIGS. 1(a), (b) show the creation of a laser-induced damage for two situations: (a)—a focal spot area of laser beam does not contain an impurity, (b) at least one impurity is at the focal area.

The invention comprises methods and apparatus for generating points of laser induced-damage inside transparent materials for producing high quality images comprising multiples of such points. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention relates to methods in which laser energy is utilized to generate visible points or areas of damage inside of an object by laser-induced breakdown phenomena. Such points may be referred to as "etch" points. Preferably, the object comprises glass through which may be viewed the created etch points. Multiple of such etch points may be utilized to generate or produce a visible image.

To provide a better understanding of the essence of the method of the present invention it is expedient first to consider the breakdown process and general dynamical phenomena, which are attendant to it. Laser-induced damage occurs when the laser irradiance exceeds a certain threshold energy value, which is characteristic of the material. When the threshold energy value is exceeded, a plasma condition is generated in a laser beam focal spot. The generation of the plasma is associated with a shock wave, which causes a cleavage in the glass or other transparent material.

The process of laser-induced damage development has several stages:

1) Creation of an initial low-density free electron concentration.
2) Buildup of this electron concentration until a density of $10^{18}$ to $10^{19}$ cm$^{-3}$ is reached.
3) Absorption of the remainder of the laser pulse by the resulting plasma.
4) An increase in temperature to a value of several thousands of degrees.
5) The generation of an initial thermally-induced sound wave which is the response of the medium following the thermal expansion of the central region during the laser heating pulse, which sound wave propagates outward.
6) The expansion of created liquid at a rate much slower than the speed of sound.
7) The generation of a pressure-induced sound wave as the liquid forms higher pressure with gradients of the order of several GPa/$\mu$m.
8) The formation of cracks at the liquid/solid interface (velocities in the range of 1 to 2 km/s).

Thereby, star structure of laser-induced damage can be reduced if:

1) The threshold value is decreased and laser energy exceeds the decreased threshold by a negligible amount;
2) The material area, in which a laser-induced damage is created, has plastic properties.

Both these effects can be reached by preliminary treatment of material or by modification of its physical state of the material during laser-induced damage creation. The last way was used in EPO Patent Document 0743128 to Balickas et al.

As it was mentioned above, this Patent discloses a method of marking products by pulses generating a laser. Destruction of the material at that location takes place in two stages. In the first stage, the resistance of the material to laser radiation is altered, while, in the second stage, destruction of the material takes place at that location. The method is based on the famous accumulation effect: when the material is irradiated with a number of pulses, each one below the threshold for which damage occurs in a single pulse, the resistance of the material to laser radiation is altered and the sample may still be damaged after several pulses. This phenomenon apparently does not appear with alkali halides, but in materials such as polymethyl methacrylate the damage threshold may drop by a factor of the order of three after the material has been struck with several (approximately four or five) laser shots in succession. However, a number of pulses, needed for decrease of the material resistance in order to produce laser-induced damage, may be different for different area of the material. Consequently, a size of damages is a random value. Thereby, 1) the method can not be used for all materials and for crystal glasses it is no enough effective; 2) the method does not give a chance to control the damage size and consequently to produce the gray shade images; 3) the method demands a very large number of pulses and consequently a long time production.

Preliminary treatment of transparent materials was described in two Russian Patents mentioned above. Russian patent publication RU 1818307 to I. M. Chyrikov, et al. discloses the method of art treatment of borosilicate and crystal glass by laser radiation of 1.06–4.5$\mu$m using pre-treatment of the material by thermal annealing. According to the method, after the thermal annealing production of images should be made at low temperature about 223–253° K. However, the method, when laser-induced breakdown is used for damage production, is not effective, because the damage threshold for the many kinds of transparent materials is on the increase. For example, the damage threshold of crystal NaCl equals to $10^{10}$Wcm$^{-2}$ (for laser wave length 1.06 $\mu$m) without thermal treatment but after thermal treatment at temperature 680° C. it equals to $1.1 \times 10^{10}$Wcm$^{-2}$, when temperature increases to 730° C. it equals to $1.5 \times 10^{10}$Wcm$^{-2}$, at temperature 800° C. it equals to $6 \times 10^{10}$Wcm$^{-2}$.

Russian patent publication RU 2059575 to N. N. Davidov, et al. discloses the method of artistic processing of the glass articles in the heated air at the temperature not exceeded the difference between temperatures of vitrifying and heat resistance. Although the damage threshold decreases, when the temperature is raised to the temperature but experiments indicate no appreciable effect.

The present patent application discloses the method and the system for production laser-induced damage images with reduced sharp star structure of damage inside transparent materials and the method has not disadvantages mentioned above.

A method of the present invention is based on the use of a transparent material in which some kinds of impurities were added preliminary. Different kinds of impurities (such as metal and semiconductors particles) in transparent optical materials considerably reduce the damage threshold. The process is highly effective. Even the inclusions of a very small size (of the order of 100A°) can be an essential source for laser damage production in real transparent optical materials. The concentration of such small impurities may be large enough ($\approx 10^7$ cm$^{-3}$) but the transparent article keeps the properties of the perfect transparent materials.

FIG. 1 shows the creation of a laser-induced damage for two situations: the first, a focal spot area of a laser beam does not contain an impurity (FIG. 1a) and the second, when at least one impurity is at the focal area (FIG. 1b). If a focal spot area does not contain an impurity, then very large energy should be concentrated at a small area and the corresponding strong shock wave creates a star damage. If a focal spot area contains an impurity then laser energy can be decreased considerably, it can be concentrated at larger area and consequently emergent shock wave is depressed.

Thermal treatment of the transparent materials comprising the impurities can increase or decrease the damage threshold depending on the kind of the inclusions. For example, for sapphire crystals containing impurities of $C_0$, Ni and Fe, high temperature annealing at T=1800° C. in an oxygen atmosphere results in a significant increase of the damage threshold, whereas for samples containing Ti and Mg impurities thermal treatment at the same conditions considerably reduces the damage thresholds. Theses thermal effects are connected with the formation and decomposition of foreign phase, absorbing inclusions of metallic or semiconductor nature.

The thermal treatment effect of threshold decrease depends on the treatment conditions such as gas atmosphere, temperature, temporal regimes and kind of impurities, containing inside transparent materials. Using color impurities (color centers), which are invisible before laser interaction, it is possible after laser breakdown to observe color laser-induced damage.

Figure 2:
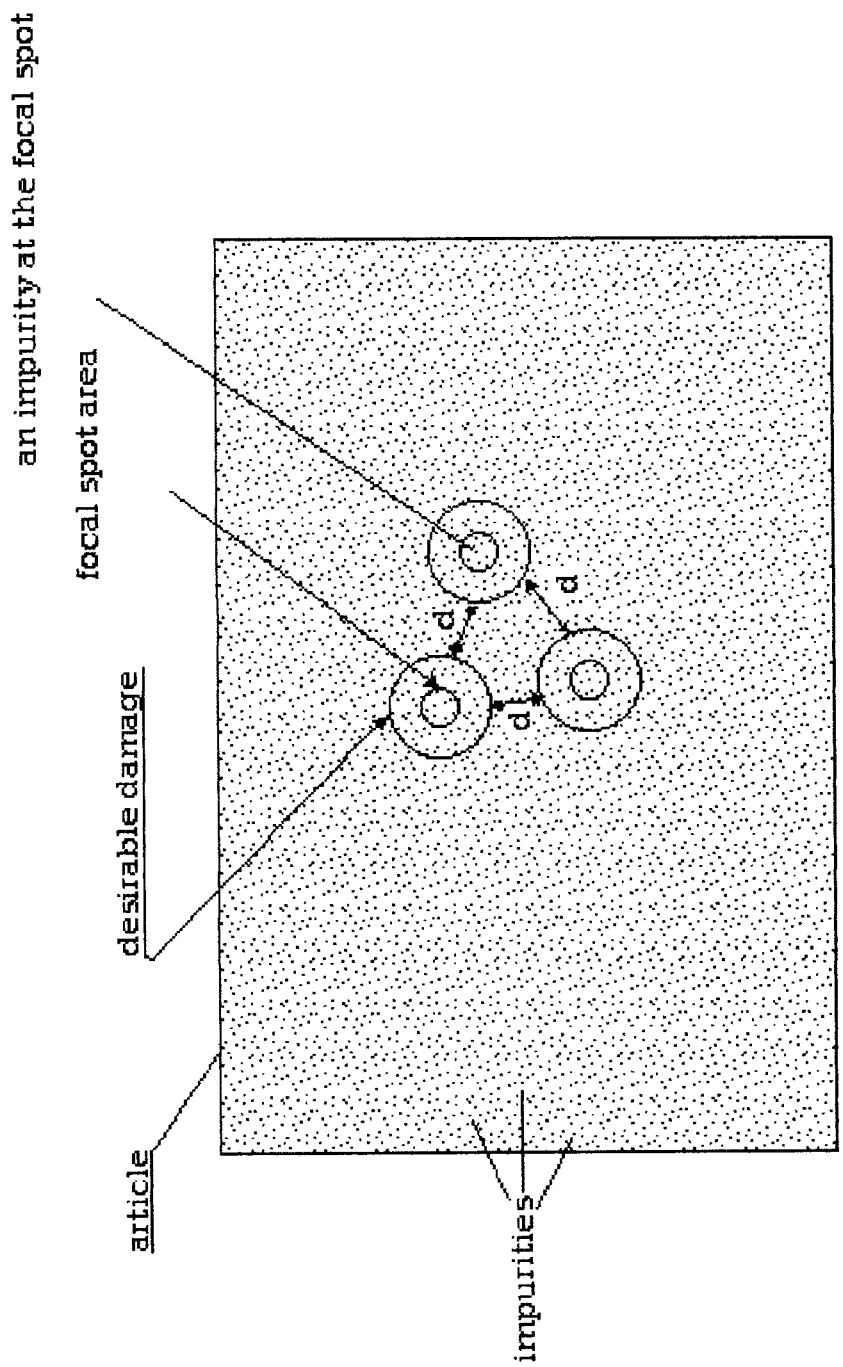
FIG. 2 shows a piece of a material containing impurities of such concentration that a focal spot of laser radiation contains at least one impurities; "d" is the minimal distance between adjacent laser-induced damages.

Insertion of impurities in transparent material is associated with creation of laser-induced damage images. A laser-induced damage image is the plurality of the etch points created by a pulsed laser beam, which is periodically focused at predetermined points. These points should be enough large so that they can be visible by scattering the exterior light. The minimum distance between etch points should be larger than a distance threshold to prevent the distortion of the reproduced image. Usually, an area of a laser focal spot is larger than an area of a corresponding damage. Taking into account these factors, impurities should be introduced in transparent material so that a focal spot area of a laser beam, which is periodically focused at predetermined point, contains at least one impurity with enough high probability (FIG. 2).

EXAMPLE 1

Let us suppose that the desirable size of damage is about 300 $\mu$m. Using laser radiation with parameters: wavelength—1.06 $\mu$m and pulse width—10 ns, it is possible to produce a laser-induced damage of the desirable size (inside an optically polished, high-index lead oxide cut glass containing Ti and Mg impurities) focusing a laser beam at area of 80 $\mu$m. The size of the focal spot along direction of a laser beam is about 200 $\mu$m. Consequently, the focal area volume is about $3.14 \times 40^2 \times 200 \equiv 5 \times 10^5$ $\mu m^3$ and if the concentration of small impurities is $\approx 10^7$ $cm^{-3}$ then a focal spot area contains upon average 5 impurities. If the impurities are uniformly distributed, then the probability, that at least one impurity is at a focal spot area, is higher than 0,99.

A method of generating a laser-induced damage image with reduced sharp star structure inside transparent material in accordance with this embodiment of the invention is as follows:

Step 1: a kind of small (invisible by naked eye) impurities, which being added to the transparent material decrease the damage threshold considerably, is determined.

Step 2: the size of the impurities is determined so that, on the one hand, the material keeps its perfect transparent properties and on the other hand, the impurities give high effect of damage threshold reduction.

Step 3: the maximal concentration of such small impurities, which keeps the transparent properties of the perfect transparent materials, is determined.

Step 4: these impurities are introduced inside the transparent material during its production so that they have determined concentration and they are uniformly distributed inside the material.

Step 5: the thermal treatment conditions of material with the impurities are determined so that its energy threshold is decreased.

Step 6: the materials undergo thermal treatment in accordance with the determined conditions (at high temperature and in an oxygen atmosphere).

Step 7: the size of laser beam focal spot is determined so that, from one hand, at least one impurity is placed at the focal spot area with enough high probability, and from another hand, the laser beam of the focal spot has to produce a laser-induced damage of a desirable size.

Step 8: an energy level of a laser pulse is determined so that energy density at every points of determined focal spot area exceeds the damage threshold corresponding to the material with impurities.

Step 9: the laser beam of determined energy is periodically focused at predetermined points of the transparent material creating laser-induced damage images.

Other embodiments of the invention comprise a method based on the change of the material state about that point in which laser-induced damage is produced during image creation. It is known that glass has the temperature interval (glass-transition range, vitrifying range) in which glass has the paste forming properties. It is also known that the damage threshold of plastic materials is considerably smaller than the corresponding value of delicate materials. Consequently, it is reasonable to heat up the material to glass-transition temperature at that point, in which laser-induced damage should be produced, and after to create breakdown at the point. It is important to notice that the larger heated area stimulates creation of the larger laser-induced damage. The final effect (size of a laser-induced damage) depends on correlation between sizes of focal spots of the radiation warming a material area and the radiation creating laser-induced damage. Laser-induced damage is produced by laser radiation for which the material is transparent material. This laser radiation is not effective to heat up a desirable area of the material. It is necessary, to use laser radiation, which is absorbed by the material enough intensity. On the other hand, this radiation should penetrate in depth of the material. Consequently, there is the optimal value of a laser wavelength, which should be used for heating an material area in desirable depth. For example, if it is necessary to heat an area of an optically polished, high-index lead oxide cut glass in depth order of 5 mm, the laser wavelength is over the range 2.5–3.5 $\mu$m.

Figure 3:
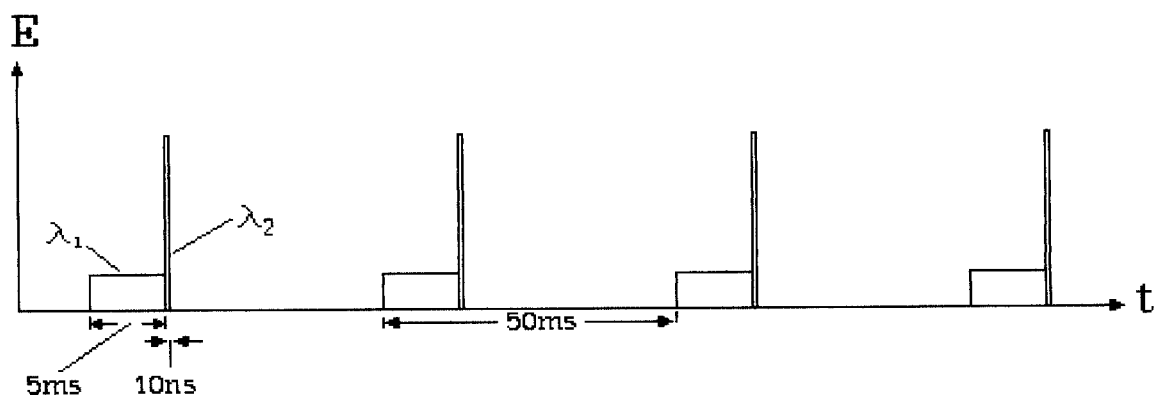
FIG. 3 illustrates a pulse pattern for a case, when etch points are produced inside a transparent material with frequency of 20 Hz; $\lambda_1$ is a wavelength of the radiation, heating material areas; its pulse width is 5 ms; $\lambda_2$ is a wavelength of the radiation, creating breakdown in the heated areas, 10 ns is pulse duration of the radiation, the repetition of the pulses is every 50 ms.

Another important difference between the laser radiations used for heating and breakdown should be taken into account. Heating demands considerably longer time than breakdown, therefore if pulse width for breakdown is usually about 10 ns, a pulse width for heating is longer and can be order of several milliseconds. For example, FIG. 3 illustrates a pulse pattern for a case, when damage creation frequency is 20 Hz.

Using such prior heating of the material area where breakdown should be produced, four very important effects reducing star structure of a laser-induced damage are realized:

1) The reduced value of damage threshold,
2) The reduced value of a temperature difference of plasma and surrounding materials;
3) The smooth variation of gradient temperature at area of damage creation;

4) The smooth variation of a modulus of elasticity at damage area creation.

A method of generating a laser-induced damage image with reduced sharp star structure inside transparent material by using two lasers in accordance with this embodiment of the invention is as follows:

Step 1: The size of the material area, which should be heated to the vitrifying temperature in order that to produce a laser-induced damage of desirable size, is determined.

Step 2: The optimal wavelength $\lambda_1$ of the first kind of laser radiation is determined so that the essential material area of the predefined points at the desirable depth should be heated to the vitrifying temperature by minimal laser energy.

Step 3: The optimal pulse width of the first kind of laser radiation is determined so that using smaller energy of the laser radiation it is possible to heat the essential material area to the vitrifying temperature and to make sure that the speed of creation laser-induced damages has the desirable value.

Step 4. The laser beam of the determined energy, wavelength and pulse width is generated by the first kind of laser and is periodically focused at the points of the transparent material heating the essential material areas to the vitrifying temperature.

Step 5. The optimal focal spot size of the second kind radiation is determined so that for the predetermined size of the heating area, desirable damage can be produced by a laser energy exceeding the damage threshold (breakdown threshold) of plastic material state by a negligible margin.

Step 6. The second kind of laser (for example, Nd-YAG laser) generates radiation exceeding the damage threshold (breakdown threshold) by a negligible amount; the radiation is directed at the transparent material and focused at the point of heated area.

Step 7. During image production, the focal spots of the heating radiation and the radiation, which creates breakdown, are migrated inside the transparent material no modifying their positional relationship.

Figure 4:
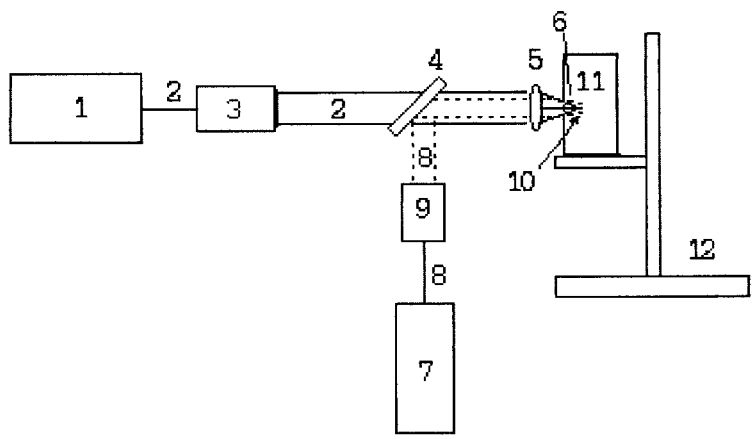
FIG. 4 is an exemplary block-diagram of a laser etching system of the invention for production of high quality laser-induced damage images by using two lasers. The laser 7 generates the radiation, which heats up a local area of an article 11 to the vitrify temperature. The laser 1 generates the radiation, which creates breakdown at the heated area.
Figure 5:
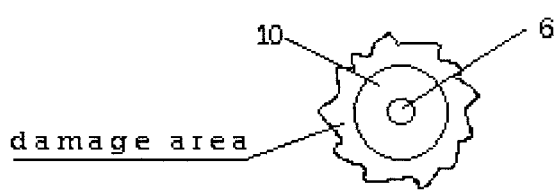
FIG. 5 shows a damage area, the focal area 6 of the laser beam 2 (FIG. 4) and the focal area 10 of the laser beam 8 (FIG. 4).

Other embodiments of the invention comprise a system for producing laser-induced damage images by using two lasers: one heats up material areas at points where damages should be produced, another creates breakdowns at these points. Reference is now made to FIG. 4, which illustrates in block-diagram form a laser etching system which may be used to produce high quality images without strong star structure of their etch points.

The laser 1 generates a narrow, high energy density, pulsed beam 2 with a wavelength of 1.06 $\mu$m, which passes through a beam expander 3 and a beam combiner 4 and after that the beam is directed to an optical system 5. The system focuses the beam at a focal area 6 of an article 11. The laser 7 generates pulsed beam 8 with a wavelength of 2–5 $\mu$m and with a pulse width, which is a lot more than the pulse width of beam 1. Once emitted from the laser 7, the pulsed beam 8 passes through a beam expander 9 and a beam combiner 4 after that is directed to an optical system 5. The system focuses the beam at a focal area 12 of the article 11 about a point of the area 6. A table drive 12 is used to displace focal areas 6 and 12 inside the article 11.

I claim:

1. A method for creating of laser-induced damage images with reduced sharp star structure comprising:

production of the special transparent material by introducing special kinds of impurities;

generating laser radiation and focusing it at predetermined points of said material so that the focal spot area contains at least one said impurity and laser energy exceeds the damage threshold of said material with said impurities at said focal area by a negligible amount.

2. The method in accordance with claim 1 wherein said impurities are determined so that the damage threshold of said material is decreased but said transparent material keeps its perfect transparent properties.

3. The method in accordance with claim 1 wherein the size of the impurities is determined so that, on the one hand, the material keeps its perfect transparent properties and on the other hand, the impurities give high effect of damage threshold reduction.

4. The method in accordance with claim 1 wherein the concentration of said impurities and their distribution inside said material are determined so that a focal spot area of said laser radiation contains at least one impurity with hidh probability.

5. The method in accordance with claim 1 wherein the materials containing said impurities undergo thermal treatment at the such conditions (at high temperature and in an oxygen atmosphere), in which the thermal treatment results in damage threshold reduction.

6. The method in accordance with claim 1 wherein the size of said focal spot is determined so that said laser-induced damage of said transparent material has desirable extent.

7. The method in accordance with claim 1 wherein colored laser-induced damage images are produced inside said transparent materials containing color impurities, which are invisible before laser interaction, but after laser breakdown become obvious.

* * * * *